United States Patent Office 3,412,778
Patented Nov. 26, 1968

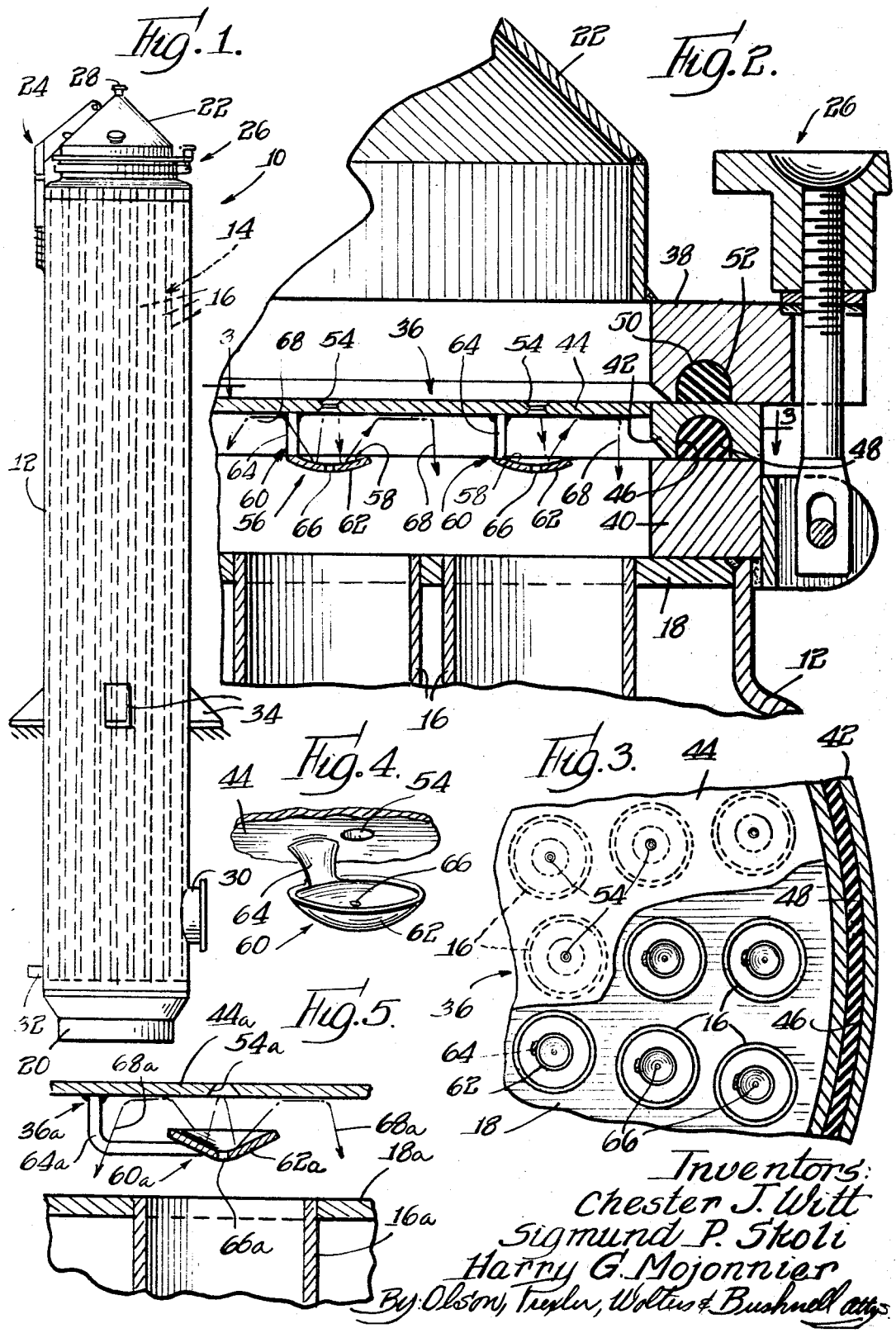

3,412,778
LIQUID DISTRIBUTOR FOR TUBULAR INTERNAL FALLING FILM EVAPORATOR
Chester J. Witt, Deerfield, Sigmund P. Skoli, Elmwood Park, and Harry G. Mojonnier, River Forest, Ill., assignors to Mojonnier Bros. Co., Chicago, Ill., a corporation of Illinois
Filed Oct. 24, 1966, Ser. No. 589,070
7 Claims. (Cl. 159—13)

ABSTRACT OF THE DISCLOSURE

A liquid feed distributor for an internal falling film tubular evaporator comprises a horizontal perforate plate located above the upper inlet ends of the vertical tubes. Liquid reflecting surface elements are pendantly supported from the plate below its perforations so that the issuing streams are reflected back to the underside of the horizontal plate for distribution before falling into the vertical tubes as films.

---

This invention relates generally to evaporator apparatus and more particularly to distribution plates for use in such apparatus.

According to conventional practice, a perforated plate is mounted over the tube nest of a vertical-tube evaporator to distribute the product for condensing among the several tubes. However, it has proved difficult to prevent deposits from forming on the underside of such a plate, especially when the product contains carmelizable sugars or other adhesive constituents. Concomitant problems have arisen with respect to cleaning the underside of such a distribution plate at the conclusion of an operating cycle.

Therefore, an important object of the present invention is to overcome these difficiencies of the prior art and provide self-cleaning distribution plate apparatus for use in vertical-tube evaporators.

A more general object of the invention is to provide new and improved evaporator apparatus.

Another object of the invention is to provide distribution plate apparatus which is arranged to direct a continuous flow of product onto the underside thereof.

These and other objects and features of the invention will become more apparent from a consideration of the following descriptions.

Distribution plate apparatus in accord with the invention includes a plate having a plurality of apertures formed therein for passing product therethrough and into operative relationship with a tube nest. In addition, a redistributor unit is disposed beneath the plate in proximity therewith, and this redistributor unit includes a number of surface elements which are positioned to receive at least a portion of the flow through the plate apertures and which are shaped to redirect received product against the confronting face of the plate.

The invention, both as to its construction and its mode of operation will be better understood by reference to the following disclosure and drawing forming a part thereof wherein:

FIG. 1 is an elevational view of an evaporator effect incorporating distribution apparatus constructed in compliance with the present invention;

FIG. 2 is an enlarged, fragmentary, cross-sectional view showing the top cone of the evaporator of FIG. 1 and the mounting of the distribution apparatus in relationship to the tube nest;

FIG. 3 is a plan view on a reduced scale and taken in cross-section substantially along the line 3—3 of FIG. 2;

FIG. 4 is a fragmentary perspective view showing one of the redistribution cup members and its mounting to the distribution plate; and FIG. 5 is a fragmentary view similar to the showing of FIG. 2 but illustrating a modified form of the invention.

Referring now in detail to the drawing, specifically to FIG. 1, evaporator apparatus indicated generally by the reference numeral 10 comprises a cylindrical housing or shell 12 which encloses a tube nest 14. The illustrated evaporator apparatus is arranged for single-pass falling-film operation; and accordingly, the tube nest 14 comprises a considerable number of evaporator tubes 16, the respective ends of which are secured in an upper tube sheet 18, shown in FIG. 2, and a lower tube sheet, not shown. Continuing with reference to FIG. 1, the lower end of shell 12 terminates in a product outlet 20 which is arranged for connection to a separating chamber, not shown; and the upper end of shell 12 is closed by a removable cap or cone 22. The cone 22 is mounted to the shell 12 by a pivot unit 24 and is secured in place over the open, upper end of the shell 12 by means of a latch arrangement 26. At its apex, the cone 22 is provided with a product inlet fitting 28. Finally, the shell 12 is fitted with a vapor or steam inlet 30, a condensate outlet 32 and circumferentially spaced mounting flanges 34, the vapor inlet 30 and the condensate outlet 32 opening into the steam space surrounding the evaporator tubes 16.

Turning to FIG. 2, distribution plate apparatus indicated generally by the reference numeral 36 is situated between a cap collar 38 and a shell collar 40 to receive inlet product and distribute the same among the several evaporator tubes 16. The distribution plate apparatus 36 includes a peripheral rim 42 and a distributing plate element 44 which is secured inside the rim 42. A downwardly opening groove 46 is fashioned in the rim 42 to receive an annular gasket 48 used in sealing against the shell collar 40. Cooperatively, the cap collar 38 is fashioned with a downwardly opening groove 50 which receives an annular gasket 52, gasket 52 sealing against the upper surface of rim 42. The distributing plate element 44 is perforated with a pattern of diploconically shaped, product-passing apertures 54; and in compliance with the features of the present invention, a redistributor arrangement 56 is disposed beneath the distributing plate element 44 in proximity therewith.

The redistributor arrangement comprises a considerable number of surface elements 58 that are positioned to receive at least a portion of the flow through apertures 54; and these surface elements are shaped to direct received product against the confronting or lower face of the distributing plate element. More specifically, the redistributor arrangement 56 is made up of individual deflector assemblies 60; and each of these deflector assemblies comprises a cup member 62 and a mounting leg or bracket 64 which is welded or otherwise suitably secured to both the distributing plate element 44 and the associated cup member 62. Advantageously, the brackets 64 are arranged to position the corresponding cup member 60 beneath a product-passing aperture 54 in the distributing plate element 44. This is shown in FIG. 4 as well as in FIG. 2. Considering FIG. 3 in conjunction with FIG. 2, it will be observed that a cup member 62 is aligned vertically with each of the apertures 54 and with each of the tubes 16. While this is an advantageous arrangement, it is recognized that other configurations may be employed.

As will be described more fully hereinbelow, the cup member 62 are intended to redirect at least a portion of the product flow through the corresponding apertures 54 onto the underside of the distributing plate element 44. For this purpose, the cup members 62 define the surface elements 58 and the surface elements themselves are provided in a concave shape. In the embodiments of FIGS.

1–4, the shape of the surface elements 58 is generally spherical. In order to drain each cup member 62, the center or bottom thereof is perforated with a passageway or hole 66 which is of lesser diameter or orifice size than the corresponding product-passing aperture 54.

The rim 42, the distributing plate element 44, the cup members 62 and the brackets 64 are advantageously fabricated from a suitable metal such as stainless steel.

Having thus described one construction of the invention, it will be valuable now to set forth how the illustrated embodiment operates. The description of operation will be given with reference to the use of milk as the product to be evaporated, by way of example only.

Assuming that the evaporator apparatus 10 has been installed and is in operation with steam surrounding the tubes 16 and with milk flowing through these tubes from the inlet 28 to the outlet 20, the orifice size of the apertures 54 will have been selected to insure a slight head over each of these apertures, the corresponding pressure drop across the aperture being equivalent to a few degees in the temperature of the milk. Specifically, a head of one or two inches will be maintained over the distributing plate element 44. Experience has indiciated that, when milk overlying the distributing element has a temperature, for example, of 120° F., on the underside of the distributing element there will be a lower vapor temperature of, for example, 117° F. However, the temperature on the underside of the distributing plate element, due to the greater heat conductance capability of the metal as compared to the vapor, will be, for example, 119¾° F. Thus, a potential for excessive evaporation and even carmelization of constituent sugars is presented by the distributing plate element.

In compliance with the features of the present inventions, the cup members 62 direct a flow of milk against and across the underside of the plate element 44 as is indicated by the arrows 68 in FIG. 2. This flow of milk prevents minute quantities of the product from excessively dewatering in the vicinity of the underside of the distributing plate element and forming a gummy, sticky coating. Thus, the distribution plate apparatus of the present invention keeps the underside of the plate element 44 free of build-up during the run of milk through the equipment. Similarly, when cleaning fluids are conducted through the equipment, the cup members 62 direct a flow of the latter materials against the underside of the distributing plate, washing and sanitizing the same. It is to be appreciated that the drain holes 66 preclude product or cleaning solutions from collecting in the concave surfaces 58 and likewise prevent salt or product build-up on these surfaces.

While a particular embodiment of the invention has been thus far shown and described, it should be understood, that the invention is not limited thereto since many modifications may be made. Therefore and in order to enhance the understanding of the invention, a modified embodiment of the invention is shown in FIG. 5. Since the embodiment of FIG. 5 is similar in many respects to the embodiment of FIGS. 1–4, like numerals have been used to designate like parts with the suffix letter "a" being used to distinguish those elements associated with the embodiment of FIG. 5.

The distribution plate apparatus 36a, which is shown in FIG. 5 is characterized by shaping the product-passing apertures 54a to be frustoconical, by fashioning bracket 64a to be L-shaped whereby to minimize its potential for interference with the redirected product from the cup member 62a, and by shaping the cup member 62a to be pyramidal rather than spherical.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. Distribution plate apparatus for a tubular balling film evaporator said plate apparatus being located above a tube sheet having vertical tubes secured therein and extending downwardly therefrom and said tubes being within a steam chest, comprising: a horizontal distributing plate element having a plurality of liquid-passing apertures therethrough; and redistributor means disposed beneath said plate element in proximity therewith, said means including a plurality of surface elements positioned to receive at least a portion of the flow through said apertures and shaped to redirect liquid received through said apertures against the confronting bottom face of said plate element.

2. Distribution plate apparatus according to claim 1 wherein said surface elements are generally concave up in shape.

3. Distribution plate apparatus according to claim 2 wherein said concave shape is spherical.

4. Distribution plate apparatus according to claim 2 wherein said concave shape is pyramidal.

5. Distribution plate apparatus according to claim 1 wherein said redistributor means comprises a plurality of individual cup members defining said surface elements and a mounting element connecting each of said cup members to said plate element.

6. Distribution plate apparatus according to claim 5 wherein there is a said cup member for each of said apertures.

7. Distribution plate apparatus according to claim 1 wherein said redistribution means includes passageway means leading down though each of said surface elements whereby to define a drain.

References Cited

UNITED STATES PATENTS

| 2,753,932 | 7/1956 | Eckstrom et al. | 159—13 |
| 3,356,125 | 12/1967 | Standiford | 159—13 |

FOREIGN PATENTS

| 3,118 | 2/1895 | Great Britain. |
| 893,633 | 4/1962 | Great Britain. |
| 133,690 | 5/1946 | Sweden. |

NORMAN YUDKOFF, *Primary Examiner.*

J. SOFER, *Assistant Examiner.*